United States Patent
Feng et al.

(10) Patent No.: US 11,823,654 B2
(45) Date of Patent: Nov. 21, 2023

(54) ACTIVE NOISE CANCELLATION SYSTEM AND METHOD WITH TIME DIVISION MULTIPLEXING

(71) Applicant: Harman International Industries, Incorporated, Stamford, CT (US)

(72) Inventors: Tao Feng, Novi, MI (US); Tingting Zhou, Suzhou (CN); Yuliu Cao, Changzhou (CN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/507,869

(22) Filed: Oct. 22, 2021

(65) Prior Publication Data
US 2023/0125511 A1     Apr. 27, 2023

(51) Int. Cl.
*G10K 11/178* (2006.01)
*H04J 3/06* (2006.01)
*H04L 12/40* (2006.01)

(52) U.S. Cl.
CPC .... *G10K 11/17827* (2018.01); *G10K 11/1787* (2018.01); *G10K 11/17854* (2018.01); *H04J 3/0617* (2013.01); *H04L 12/40013* (2013.01); *H04L 2012/40273* (2013.01)

(58) Field of Classification Search
CPC ......... G10K 11/17827; G10K 11/1787; G10K 11/17854; H04J 3/0617; H04L 12/40013; H04L 2012/40273
USPC ...................................................... 381/71.5
See application file for complete search history.

(56) References Cited

U.S. PATENT DOCUMENTS

| | | | |
|---|---|---|---|
| 6,940,982 B1 * | 9/2005 | Watkins | G10K 11/1785 381/119 |
| 2013/0124763 A1 * | 5/2013 | Kessler | G06F 13/364 710/110 |
| 2016/0300559 A1 | 10/2016 | Lee et al. | |
| 2017/0222790 A1 | 8/2017 | Hooper et al. | |
| 2017/0323631 A1 * | 11/2017 | Close | G10K 11/17881 |

FOREIGN PATENT DOCUMENTS

CN      212647880 U      3/2021

OTHER PUBLICATIONS

European Search Report for European Application No. 22202669.2, dated Feb. 24, 2023, 23 pgs.

* cited by examiner

*Primary Examiner* — Vivian C Chin
*Assistant Examiner* — Douglas J Suthers
(74) *Attorney, Agent, or Firm* — Brooks Kushman P.C.

(57) ABSTRACT

In at least one embodiment, an active noise cancellation system. The system includes a first controller, a data bus, and a second controller. The first controller receives first information from a plurality of noise sensing devices and second information from an audio system. The first controller employs a time division multiplexing scheme to generate a multiplexed stream of data including the first information and the second information. The data bus transmits the multiplexed stream of data on a single data channel. The second controller receives the multiplexed stream of data on the single data channel and separates the first information from the second information on the multiplexed stream of data to perform ANC functionality.

15 Claims, 4 Drawing Sheets

ACTIVE NOISE CANCELLATION SYSTEM AND METHOD WITH TIME DIVISION MULTIPLEXING

TECHNICAL FIELD

Aspects disclosed herein generally relate to an active noise cancellation (ANC) system and method with time division multiplexing (TDM). In one example, the disclosed system and method may be implemented for ANC systems that are utilized for automotive applications. The disclosed system and method may also increase the capability of various sensors and other devices and preserve resources on various data communication busses or data channels. These aspects and others will be discussed in more detail herein.

BACKGROUND

Active noise cancellation (ANC) systems generally provide an effective approach to cancel low frequency interior noise in a vehicle. Such a low frequency interior noise may comprise engine and road noise. The ANC system generally applies a multiple input multiple output (MIMO) system which includes a plurality of accelerometer sensors, a plurality of error microphones, and a plurality of loudspeakers to collect or deliver information indicative of at least the interior noise. Generally, in order to couple or connect the sensors, microphones, and loudspeakers; a large amount of electrical cable or wiring may be required. Various bus systems or data buses may be utilized to reduce the amount of electrical wiring in the vehicle. However, such data busses may have inherent limitations.

SUMMARY

In at least one embodiment, an active noise cancellation system is disclosed. The system includes a first controller, a data bus, and a second controller. The first controller is programmed to receive first information from a plurality of noise sensing devices and second information from an audio system positioned in a vehicle. The first controller is programmed to employ a time division multiplexing scheme on the first information and the second information received to generate a multiplexed stream of data including the first information and the second information. The data bus is configured to transmit the multiplexed stream of data on a single data channel. The second controller is programmed to receive the multiplexed stream of data on the single data channel and to separate the first information from the second information on the multiplexed stream of data to perform ANC functionality.

In at least another embodiment, an active noise cancellation method is disclosed. The method includes receiving first information from a plurality of noise sensing devices and second information from an audio system positioned in a vehicle and employing a time division multiplexing scheme on the first information and the second information received to generate a multiplexed stream of data including the first information and the second information. The method further includes transmitting the multiplexed stream of data on a single data channel of a data bus and separating the first information from the second information on the multiplexed stream of data to perform ANC functionality.

In at least another embodiment, a computer-program product embodied in a non-transitory computer read-able medium that is programmed for performing active noise cancellation in a vehicle is disclosed. The computer-program product includes instructions for receiving first information from a plurality of noise sensing devices and second information from an audio system positioned in a vehicle and for employing a time division multiplexing scheme to the first information and the second information received to generate a multiplexed stream of data including the first information and the second information. The computer-program product further includes instructions for transmitting the multiplexed stream of data on a single data channel of a data bus and for separating the first information from the second information on the multiplexed stream of data to perform ANC functionality.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
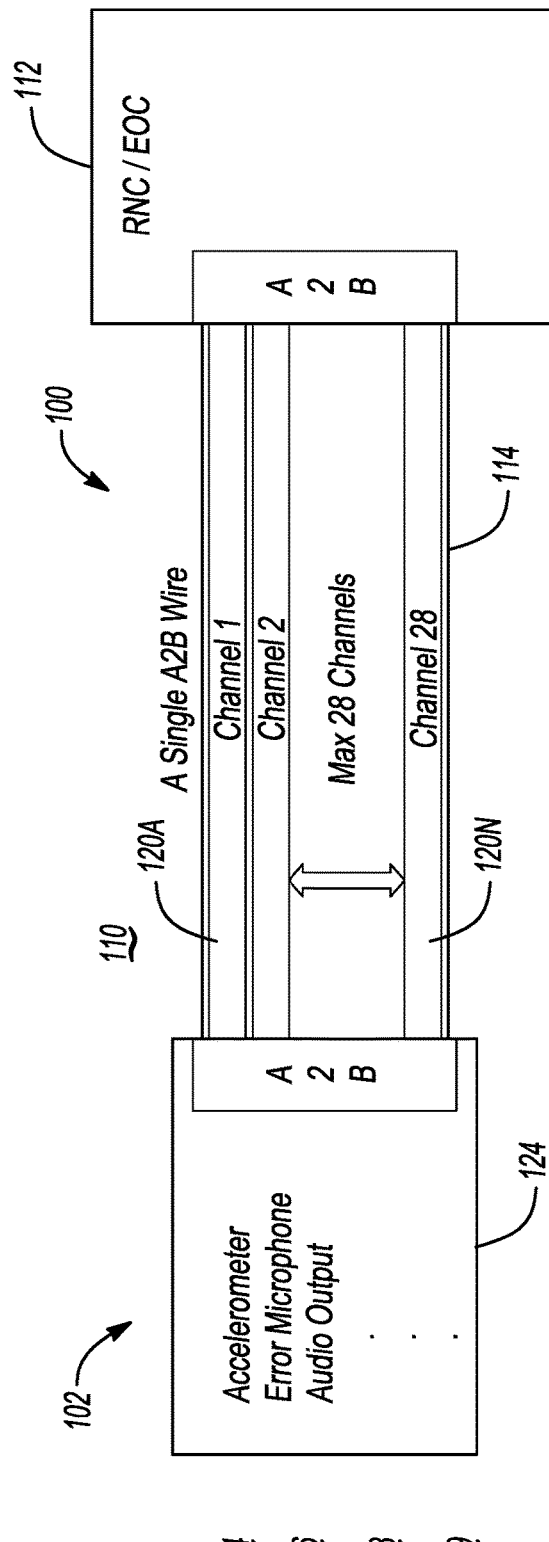
FIG. 1 depicts one example of a system having a signal flow between devices of an ANC system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EE- PROM)) positioned within the housing. The controller(s) as disclosed also include hardware-based inputs and outputs for receiving and transmitting data, respectively from and to other hardware-based devices as discussed herein.

Active noise cancellation (ANC) systems generally detect disturbances and undesired noise and transmit signals indicative of the undesired noise to an ANC controller. In one example, accelerometers mounted exterior to the vehicle may provide information indicative of road noise and error microphones positioned in an interior of the vehicle may provide information indicative of road noise or engine noise present in the interior of the vehicle. In turn, the ANC controller may transmit sound that is out of phase via one or more loudspeakers in the vehicle. The out of phase audio transmitted by the loudspeakers may cancel the disturbing noise present in the interior of the vehicle.

In general, the disclosed system and method may increase the capability of the sensors and devices in an ANC system and reduce the number of data bus channels. While reducing the number of data bus channels, the disclosed system and method may maintain high levels of ANC system performance. For example, with TDM technology, the ANC system may transmit multiple signals on one common channel. Similarly, with TMD, multiplexing and demultiplexing methods may be employed to obtain a mixed signal and restore originally transmitted multiple signals.

FIG. 1 depicts one example of a system 100 having a signal flow between various devices of an ANC system 102. It is recognized that the ANC system 102 generally includes a plurality of accelerometers 104, a plurality of error microphones 106, a plurality of loudspeakers 108, and an audio system 109. It is also recognized that the audio system 109 may include an audio controller and amplifier (not shown) that is programmed to transmit one or more audio signals to the loudspeakers 108 for playback in a vehicle 110. In general, the ANC system 102 may be utilized for a vehicle 110. In this regard, the accelerometers 104 may be mounted on an external portion of the vehicle 110 and the error microphones 106 and the loudspeakers 108 may be positioned internally, within the vehicle 110. An ANC controller 112 is coupled to the accelerometers 104, the error microphones 106, and the loudspeakers 108. The digital bus 114 may enable bi-directional transfer of information between the ANC controller 112 and the accelerometers 104, the error microphones 106, and the loudspeakers 108. In one example, the digital bus 114 may be implemented as a single Automotive Audio Bus (A2B) to enable bi-directional data transmission between the ANC controller 112 and the accelerometers 104, the loudspeakers 106, and the loudspeakers 108. A front-end controller 124 may be operably coupled to the accelerometers 104, the error microphones 106, and the loudspeakers 108. The front-end controller 124 may convert the data received from the accelerometers 104, the error microphones 106, and the loudspeakers 108 into a digital format for transmission on the A2B 114.

The A2B 114 may be implemented as a single wire communication bus to reduce the number of wires that would otherwise be coupled between the ANC controller 112 and the accelerometers 104, the error microphones 106, and the loudspeakers 108. The front-end controller 124 may convert (e.g., analog to digital conversion) the data received from the accelerometers 104 the error microphones 106, and the loudspeakers 108 into a digital format for transmission on the A2B 114 to the ANC controller 112. The front-end controller 124 may convert (e.g., digital to analog conversion) for data that is received from the ANC controller 112 and intended for transmission to the loudspeakers 108.

It is recognized that the ANC system 102 generally provides narrow band noise cancellation (e.g., engine noise cancellation) and/or broad band noise cancellation (e.g., road noise cancellation) to reduce noise in an interior cabin of the vehicle 110. In general, the ANC system 112, may need a large number of different types of input sensors to satisfy ANC system performance requirements. In this case, it may be desirable to provide twenty-eight channels. In general, the A2B 114 may have a constant bandwidth and a fixed number of channels 120. For example, the A2B 114 may support the twenty-eight channels with each channel 120 supporting 32 bits. In the event additional channels are needed that exceed the twenty-eight channels, an additional cable and more hardware for the A2B 114 may be required which increases the overall cost and complexity of the ANC system 102. Thus, embodiments disclosed herein provide, inter alia, for an advanced ANC system which obviates the need to add additional channels while maintaining ANC system performance. In addition, the embodiments disclosed herein also enable the transfer of higher bandwidth signals in one wire, such as for example, 64 bits/s or higher.

Figure 2:
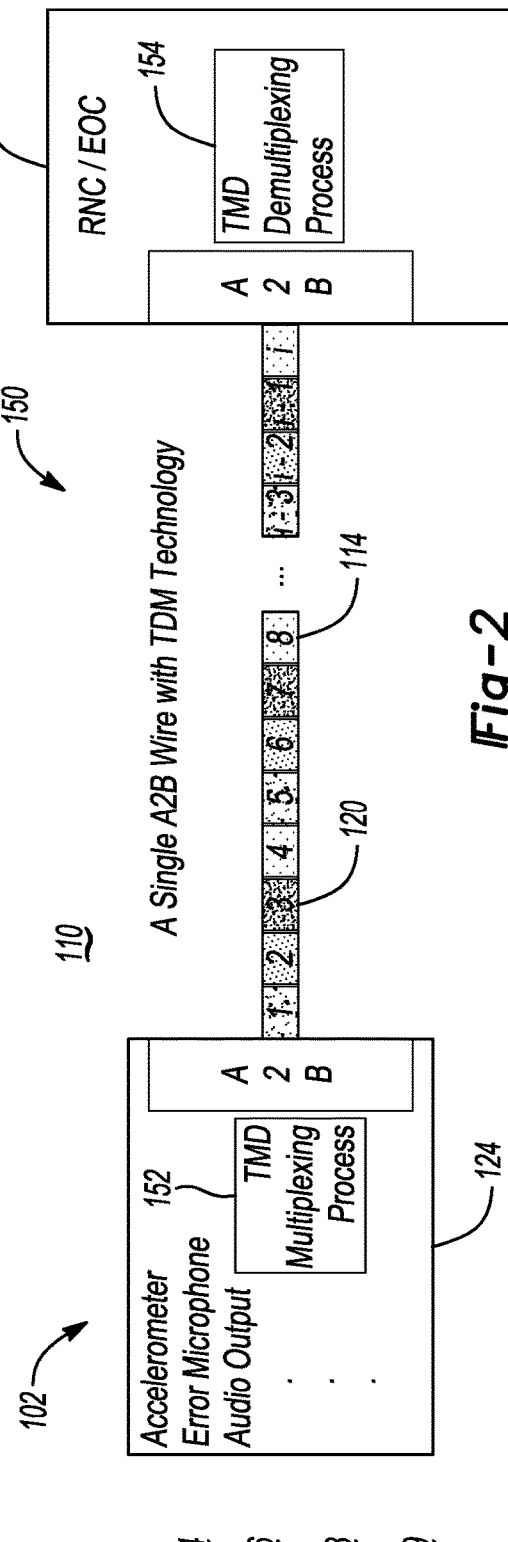
FIG. 2 depicts a system for providing time division multiplexing (TDM) for an active noise cancellation (ANC) system in accordance with one embodiment.

FIG. 2 depicts a system 150 for providing time division multiplexing (TDM) for the ANC system 102 in accordance with one embodiment. The front-end controller 124 may transmit data from each of the plurality of accelerometers 104, the plurality of error microphones 106, and the plurality of loudspeakers 108 (e.g., through one common channel) via a time-division multiplexing (TDM) scheme to the ANC controller 112. The front-end controller 124 may include a multiplexer circuit 152 for transmitting data via the TDM scheme. For example, the front-end controller 124 may transmit multiple signals into one common signal (or one mixed signal) to the ANC controller 112. In particular, with TDM, it is possible to multiplex four or eight channel signals into one channel in a time iteration (e.g., see channel 120 where data is transmitted every fourth time iteration). The ANC controller 112 may include a demultiplexer circuit 154 that can demultiplex the mixed signal and restore the four channel signals.

Figure 3:
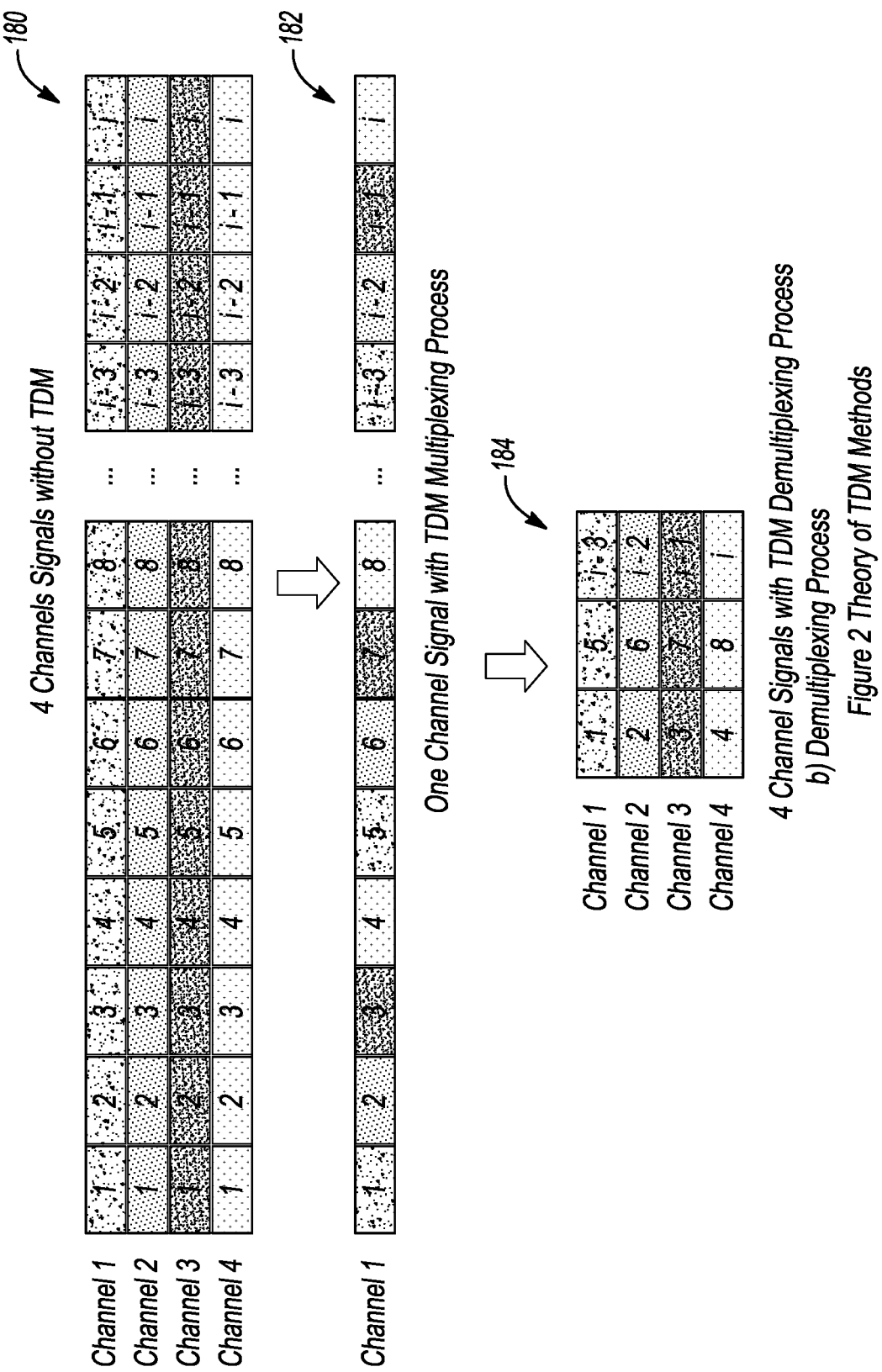
FIG. 3 depicts one example of a multiplexing scheme and a de-multiplexing scheme employed by the system of FIG. 2 in accordance with one embodiment.

FIG. 3 depicts one example of a data transmission scheme employed by the system 100 and another example of the TDM scheme employed by the system 150 of FIG. 2 both in accordance with one embodiment. As noted above, the system 100 generally employs a plurality of channels 120 while utilizing the A2B 114. This is generally shown at 180 in FIG. 2. Conversely, the system 150 generally employs a TDM scheme that utilizes a single channel 120 based on the utilization of the multiplexer circuit 152 and the demultiplexer circuit 154. The multiplexing aspect is generally shown at 182 and the demultiplexing aspect is generally shown at 184.

As shown at 180, the system 100 transmits data over, for example, 4 data channels 120a-120d. In one example, the data transmitted over the channel 120a may correspond to data transmitted from a first accelerometer 104 via the front-end controller 124, the data transmitted over the channel 120b may correspond to data transmitted from a second accelerometer 104 via the front-end controller 124, the data transmitted over the channel 120c may correspond to data transmitted from a first error microphone 106, and the data transmitted over the channel 120d may correspond to data transmitted from the audio system 109. Due to noise and vibration that originates from a wheel moving on the road surface and/or from an engine compartment, one or more of the accelerometers 104 collect the noise and/or vibration information, which has a high correlation to the interior noise. Each of the accelerometers 104 may output a related noise and vibration signal (which is indicative of the collected noise and vibration information) that is transferred to the front-end controller 124 as ANC system inputs. The front-end controller 124 transmits a digital version of the noise and vibration signals for each noise and vibration signal received to the ANC controller 112 over a corresponding data channel 120a-120n. The ANC controller 112 then updates an ANC algorithm, accordingly, based on each received noise and vibration signal. To receive the interior noise information, one or more of the error microphones 106 may, for example, be positioned in a headliner and/or headrest of seats. Each error microphone 106 may output an error signal that is transmitted to the front-end controller 214. Each error signal generally represents noise present in the cabin of the vehicle 110 as detected by the error microphones 104. The front-end controller 124 transmits a digital version of the error signals for each noise and vibration signal received to the ANC controller 112 over the corresponding data channels 120a-120n. The ANC controller 112 then updates an ANC algorithm, accordingly, based on each received error signal and vibration signal.

In general, when the audio system 109 plays back audio in the vehicle 110, such audio may affect ANC system performance. Thus, the ANC system (i.e., the ANC controller 112) requires information pertaining to the audio that is being played back in the vehicle 110. For example, the ANC controller 112 receives the audio signal that is being played by the audio system 109 and prevents the ANC system from canceling the audio (e.g., FM signal, etc.) while the audio system 109 plays back the audio in the vehicle 110.

As shown at 182, the system 150 (or the front-end controller 124 via the multiplexer circuit 152) transmits data for the first accelerometer 104, the second accelerometer 104, the first error microphone 106, and the audio system 109 on a single channel 120 to the ANC controller 112. The data from as transmitted from each of the first accelerometer 104, the second accelerometer 104, the first error microphone 106, and the audio system 109 is divided into corresponding data packets in time slots. Thus, the data is divided over the time slots for transmission one a single channel to the ANC controller 112.

As shown at 184, the system 150 (or the ANC controller 112 via the demultiplexer circuit 154) aggregates or collects the data and partitions the data to coincide with dedicated channels for the data provided by the first accelerometer 104, the second accelerometer 104, the first error microphone 106, and the audio system 109.

Figure 4:
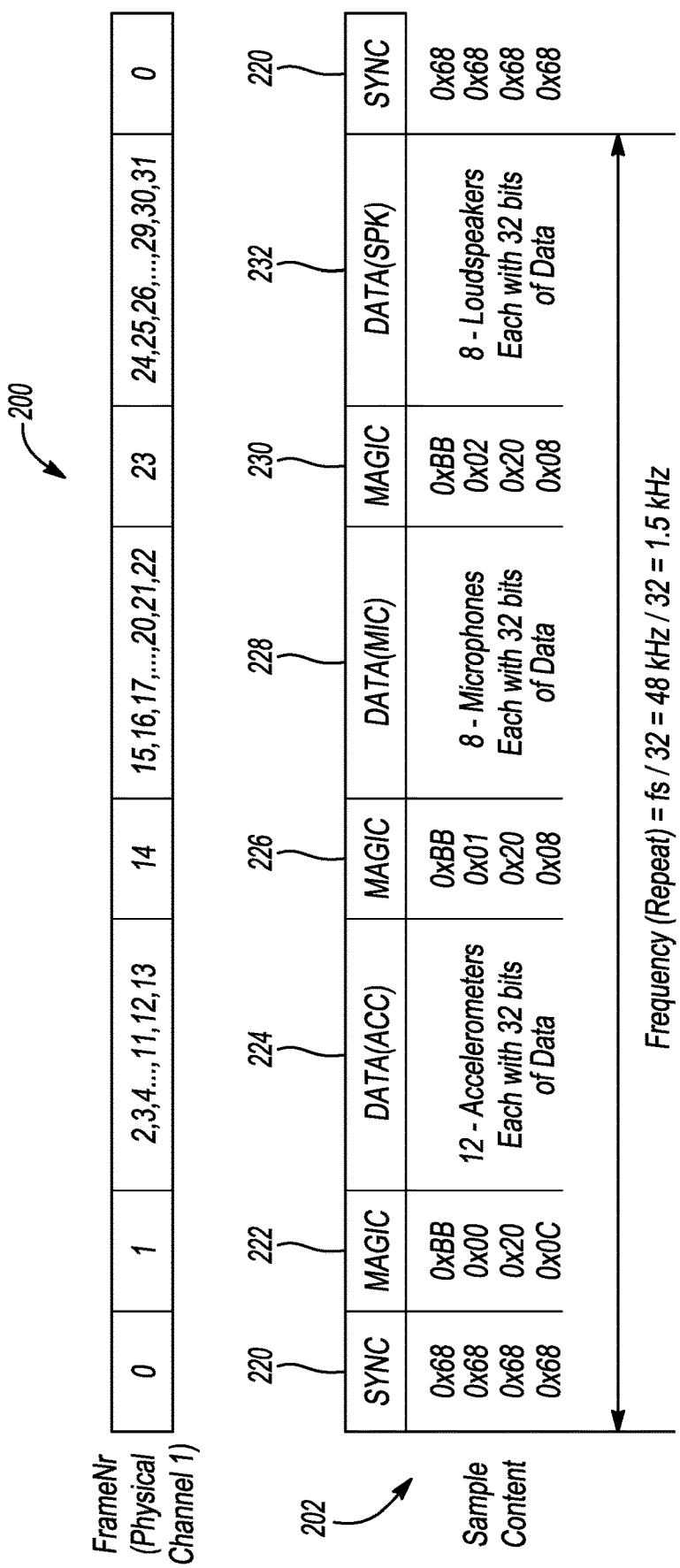
FIG. 4 depicts one example of a first frame of data for one channel of on a data bus that employs TDM and also second frame of data for one channel on the data bus that employs TDM in accordance with one embodiment.

FIG. 4 depicts one example of a first frame of data 200 for one channel on a data bus (e.g., the A2B 114) that employs TDM and a second frame of data 202 for one channel on the data bus (e.g., the A2B 114) that employs TDM in accordance with one embodiment. In general, the first frame of data 200 may include a total of 32 bits of data. The second frame of data 202 generally illustrates digital data that is generated by the front-end controller 124 for information transmitted from the accelerometer 104, the error microphone 106, and the audio system 109.

The second frame of data 202 includes a SYNC field 220, a first MAGIC field 222, a first data field 224, a second MAGIC field 226, a second data field 228, a third MAGIC field 230, and a third data field 232. The second frame of data 202 generally corresponds to an example of data transfer for a road noise cancellation (RNC) system that may include, for example, twelve accelerometers 104, eight error microphones 106, and eight loudspeakers 108. The SYNC field 220 is fixed as 0x68686868 and is used to synchronize the data in one physical A2B data channel. Each of the first MAGIC field 222, the second MAGIC field 226, and the third MAGIC field 230 includes four bytes that include the following:

1) Magic ID (first byte): which is an identification mark and fixed as 0xBB.
2) ID (second byte): which defines the signal type (e.g., the user may define 255 signal type).
3) SR (third byte): which defines the data sampling rate in the ANC system 102. The SR (third byte) may be fixed as 0x20 which entails 1.5 kHz sampling rate for ANC system 102.
4) NS (fourth byte): which defines monitoring data channels number.

The first MAGIC field 222 serves as an identifier that the following data corresponds to data from the accelerometers 104 (e.g., see data in the first data field 224), the second MAGIC field 226 servers as an identifier that the following data corresponds to data (e.g., see data in the second data field 228) from the error microphones 106, and the third MAGIC field 230 serves as an identifier that the following data corresponds to data from the loudspeakers 108 (e.g., see data in the second data field 232). The frequency for the transmission of the single channel 120 may be, for example, fs/32=48 kHz/32=1.5 kHz.

Figure 5:
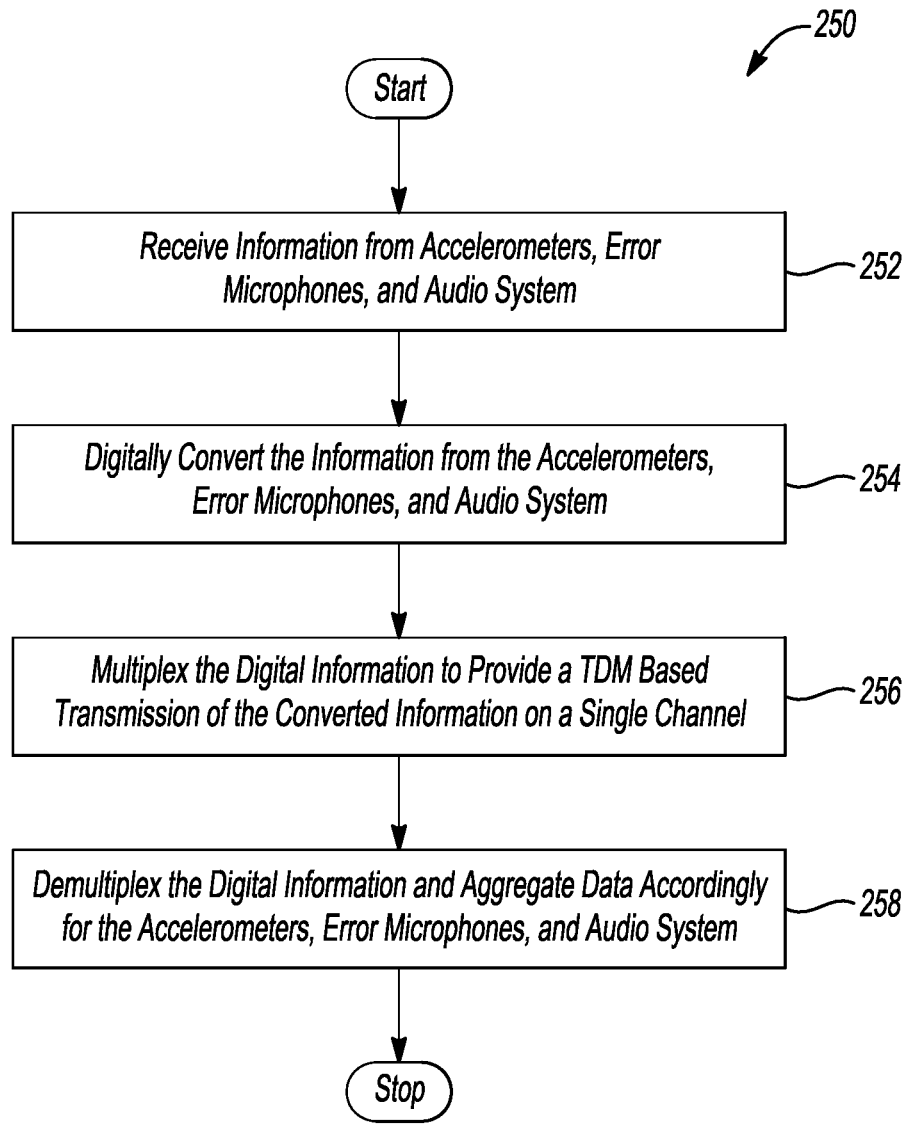
FIG. 5 depicts a method for providing TDM for the ANC system in accordance with one embodiment.

FIG. 5 depicts a method 250 for providing TDM for the ANC system 102 in accordance with one embodiment. In operation 252, the front-end controller 124 receives analog information from the accelerometers 104, the error microphones 106, and the loudspeakers 108. In operation 254, the front-end controller 124 converts the analog information received from the accelerometers 104, the error microphones 106, and the loudspeakers 108 into a digital format. In operation 256, the front-end controller 124 employs TDM on the digital data to provide the digital data on a single channel 120 to the ANC controller 112. In operation 258, the ANC controller 112 demultiplexes the digital data and aggregates (or collects) the information for the accelerometers 104, the error microphones 104, and the loudspeakers 108 and processes such information to perform the ANC functionality.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An active noise cancellation system, the system comprising:
    a first controller programmed to receive first information from a plurality of noise sensing devices and second information from an audio system positioned in a vehicle, the first controller being programmed to employ a time division multiplexing scheme on the first information and the second information received to generate a multiplexed stream of data including the first information and the second information;
    a data bus configured to transmit the multiplexed stream of data on a single data channel; and
    a second controller programmed to receive the multiplexed stream of data on the single data channel and to separate the first information from the second information on the multiplexed stream of data to perform Active Noise Cancellation (ANC) functionality, wherein the second controller includes a demultiplexer circuit programmed to separate the first information from the second information on the multiplexed stream of data, and wherein the demultiplexer circuit is programmed to separate the first information from the second information prior to the second controller performing the ANC functionality, and wherein the multiplexed stream of data as transmitted by the data bus on the single data channel includes:
first information indicative of data being transmitted from at least one of a plurality of accelerometers, a plurality of loudspeakers, and a plurality of microphones for an ANC system; and
second information indicative of a data sampling rate for transmitting the multiplexed stream of data on the single data channel.

2. The active noise cancellation system of claim 1, wherein the plurality of noise sensing devices include a plurality of accelerometers that provide first signals indicative of noise and vibrations present in an engine compartment or that originate from a wheel on a road surface.

3. The active noise cancellation system of claim 2, wherein the first information of the multiplexed stream of data is indicative of the noise and vibrations present in the engine compartment or that originate from the wheel on the road surface.

4. The active noise cancellation system of claim 1, wherein the plurality of noise sensing devices include a plurality of error microphones that provide first signals indicative of noise present in an interior of the vehicle.

5. The active noise cancellation system of claim 4, wherein the first information of the multiplexed stream of data is indicative of noise present in the interior of the vehicle.

6. The active noise cancellation system of claim 1, wherein the second information of the multiplexed stream of data is indicative of audio being played back in the vehicle.

7. The active noise cancellation system of claim 1, wherein the data bus is an Automotive Audio Bus (A2B) that transits the multiplexed stream of data on the single data channel.

8. An active noise cancellation method comprising:
receiving first information from a plurality of noise sensing devices and second information from an audio system positioned in a vehicle,
employing a time division multiplexing scheme on the first information and the second information received to generate a multiplexed stream of data including the first information and the second information;
transmitting the multiplexed stream of data on a single data channel of a data bus;
separating the first information from the second information on the multiplexed stream of data to perform Active Noise Cancellation (ANC) functionality; and
demultiplexing the multiplexed stream of data to separate the first information from the second information,
wherein demultiplexing the multiplexed stream of data further includes separating the first information from the second information prior to performing the ANC functionality, and wherein the multiplexed stream of data as transmitted by the data bus on the single data channel includes:
first information indicative of data being transmitted from at least one of a plurality of accelerometers, a plurality of loudspeakers, and a plurality of microphones for an ANC system; and
second information indicative of a data sampling rate for transmitting the multiplexed stream of data on the single data channel.

9. The method of claim 8, wherein the plurality of noise sensing devices include a plurality of accelerometers that provide signals of noise and vibrations present in an engine compartment or that originate from a wheel on a road surface.

10. The method of claim 9, wherein the first information of the multiplexed stream of data is indicative of the noise and vibrations present in the engine compartment or that originate from the wheel on the road surface.

11. The method of claim 8, wherein the plurality of noise sensing devices include a plurality of error microphones that provide first signals indicative of noise present in an interior of the vehicle.

12. The method of claim 11, wherein the first information of the multiplexed stream of data is indicative of noise present in the interior of the vehicle.

13. The method of claim 8, wherein the second information of the multiplexed stream of data is indicative of audio being played back in the vehicle.

14. The method of claim 8, wherein the data bus is an Automotive Audio Bus (A2B) that transits the multiplexed stream of data on the single data channel.

15. A computer-program product embodied in a non-transitory computer read-able medium that is programmed for performing active noise cancellation in a vehicle, the computer-program product being executed by at least one controller and comprising instructions for:
receiving first information from a plurality of noise sensing devices and second information from an audio system positioned in a vehicle;
employing a time division multiplexing scheme to the first information and the second information received to generate a multiplexed stream of data including the first information and the second information;
transmitting the multiplexed stream of data on a single data channel of a data bus;
separating the first information from the second information on the multiplexed stream of data to perform Active Noise Cancellation (ANC) functionality; and
demultiplexing the multiplexed stream of data to separate the first information from the second information prior to performing the ANC functionality,
wherein the multiplexed stream of data as transmitted by the data bus on the single data channel includes:
first information indicative of data being transmitted from at least one of a plurality of accelerometers, a plurality of loudspeakers, and a plurality of microphones for an ANC system; and
second information indicative of a data sampling rate for transmitting the multiplexed stream of data on the single data channel.

* * * * *